United States Patent [19]

Sousa et al.

[11] Patent Number: 4,870,431

[45] Date of Patent: Sep. 26, 1989

[54] INK JET PRIMING SYSTEM

[75] Inventors: John G. Sousa, Nashua, N.H.; Calvin M. Winey, Tewksbury, Mass.; Allan G. Hock, Londonderry; Carl D. Lutz, Derry, both of N.H.

[73] Assignee: Howtek, Inc., Hudson, N.H.

[21] Appl. No.: 116,246

[22] Filed: Nov. 2, 1987

[51] Int. Cl.⁴ .............................................. G01D 15/16

[52] U.S. Cl. ................................ 346/140 R; 346/1.1; 346/75

[58] Field of Search .................... 346/140 PD, 1.1, 75

[56] References Cited

U.S. PATENT DOCUMENTS

| | | | |
|---|---|---|---|
| 4,240,082 | 12/1980 | Yu | 346/75 |
| 4,301,460 | 11/1981 | Miura et al. | 346/140 R |
| 4,376,283 | 3/1983 | Bower | 346/140 PD |
| 4,432,005 | 2/1984 | Duffield et al. | 346/140 PD |
| 4,558,326 | 10/1985 | Kimura et al. | 346/1.1 |
| 4,623,897 | 11/1986 | Brown | 346/75 |
| 4,658,274 | 4/1987 | DeYoung | 346/140 R |
| 4,668,965 | 5/1987 | Tanaka et al. | 346/140 R |
| 4,714,936 | 12/1987 | Helinski et al. | 346/140 PD |

*Primary Examiner*—E. A. Goldberg

*Assistant Examiner*—Huan H. Tran

*Attorney, Agent, or Firm*—Nutter, McClennen & Fish

[57] ABSTRACT

An ink jet priming system for an ink jet printer having a reservoir containing ink for ink jets connected thereto and a reservoir opening for receiving ink is described. The ink jet priming system is provided with a seal for selectively closing the reservoir opening. Pressurized air is supplied to the reservoir from a tank connected thereto through an opening in the seal. The flow of air to the reservoir is controlled so that there is an initial low pressure air flow to force ink into the jets followed by a high pressure flow to force the discharge of the streaming discharge of the ink. A gutter assembly, connected to a disposable waste container is provided for receiving and collecting the ink discharged during the priming process. The ink jet priming system can be used with a moving print head that contains two or more separate reservoirs each with a separate reservoir opening. When used with a moving print head-multiple reservoir printer, the priming system is provided with a capture assembly for positioning the print head so a single system can be used to seal and prime all the reservoirs.

36 Claims, 9 Drawing Sheets

INK JET PRIMING SYSTEM

FIELD OF THE INVENTION

This invention relates to ink jet printers and in particular to an ink jet printer with a system for priming the jets of the printer so they each have a full head of ink.

BACKGROUND OF THE INVENTION

Ink jet printers are becoming an increasingly popular type of device for recording permanent images on paper. Ink jet printers operate by directing a stream of minute ink droplets at the paper so as to produce a distinct pattern of individual ink dots thereon. The final image produced is the collective form of the individual ink dots. By forming ink dots at selected locations on the paper, and by regulating the number of ink dots formed on the paper, an ink jet printer can be used to create almost any type of print: text; graphics; or images. This capability has made it attractive to attach ink jet printers to computer systems that produce figurative, image and textual output simultaneously. This is because a properly programmed ink jet printer can be used to produce a complicated figure, and a detailed description of the figure, or the same page or the inclusion of images in combination with the above or alone.

Moreover, many ink jet printers are capable of discharging multiple colors of ink so as to generate quality color figures and illustrations. This capability has contributed to their popularity since computers that can generate multi-color video output in the form of figures and images are becoming increasingly common. These computer systems require printing devices that can produce permanent images of the output they generate.

Ink jet printers are provided with an inking system that includes one or more ink jets that are directed towards the paper on which the ink is to be deposited. Each ink jet typically has a jet opening through which the ink is discharged and a jetting chamber immediately behind the jet opening. A transducer generates vibrational movement to the ink in the jetting chamber to provide the mechanical energy needed to discharge the ink droplets therefrom. A feed line from an ink reservoir supplies ink to the jetting chamber for discharge.

A variety of inks are used in ink jet printers, including inks that are normally liquid at room temperatures and above (hereinafter referred to simply as "liquid" inks) and those that are normally solid at room temperatures but that are heated to elevated temperatures to liquefy them for jetting (the so-called "hot-melt" or "phase-change" inks). Hot-melt inking systems are used, in part, because the ink they discharge solidifies rapidly on contact with the paper and the forms ink dots with very sharp optical edges so the resulting images are of very high quality. Hot melt inks also have exceptional true color mixing properties which is an important characteristic for color printers that typically have three base color inks, plus black, that are blended together to print a very large spectrum of intermediate colors.

Practically every ink jet printer, liquid and hot melt, must be able to consistently discharge ink droplets of substantially the same size. This is so the droplets form identical ink dots on the paper which are necessary to produce a final image that is an accurate representation of the desired output. Another consideration in the design of an ink jet printer is insuring the ink droplets discharged from the jets travel at a substantially identical velocity. This is important because with most ink jet printers either the print head carry the jets or the paper is moving. Consequently, if the ink droplets must travel at a velocity so they are all accurately deposited on the paper to form the desired image. If the ink droplets travel at varying velocities they will be inaccurately deposited on the paper and the quality of the resulting image will be degraded.

In order for most ink jet printers to discharge ink droplets of substantially the same size, it is necessary for each of the printers' jets to have a full head of ink through the jetting chamber, up into the jet opening. If there is any air in the jetting chambers, typically in the form of small air bubbles, when the jets are activated they discharge air. Alternatively, air in the jetting chambers distorts the velocity at which the ink droplets are discharge from the jets so that consequently the droplets inaccurately form ink dots on the paper. Air bubbles of 10 mils (0.01 inch) in diameter in a jetting chamber have been found to prevent the discharge of ink droplets therefrom. Smaller air bubbles are suspected of distorting the velocity of ink droplets that are discharged from the jets.

Sometime during the operation of almost every ink jet printer, one or more of the ink jets lose their full head of ink. This often happens at the end of the day after the printer has been turned off, and the ink jets are no longer being activated to discharge ink droplets.

Air bubbles are prone to form in almost every type of ink jet printer, liquid or hot melt. Air bubbles form in a printer employing liquid ink as a consequence of very minute gas bubbles in the ink agglomerating into large bubbles in the jetting chambers. Also, when the printer is turned off, such as at the end of the day when printing is complete, the ink menisci at the jet opening have a tendency to dry out and break. This allows air to flow through the jet opening and enter the jetting chamber. Furthermore, shock and vibration an ink jet printer may be subjected to in a normal environment may be sufficient to cause bubbles to form within the ink jets.

Air bubbles form in hot melt printers as a consequence of the printer being turned off and on such as at the end and start of successive days of using the printer. When a hot melt printer is turned off, the heating elements are deactivated. Ink in the jets then resolidifies and contracts. When the printer is turned on again and the heating elements are reactivated, the reliquefied ink is in the form of a bubbly froth head unsuitable for accurate jetting.

Moreover, the capability of most ink jet printers are adversely affected by contaminants such as small bubbles and bits of matter that form in the interior spaces of their jets. These contaminants disrupt the flow of ink to the jetting chamber and out the jet opening so that droplets of varying size are discharged therefrom. In some instances these contaminants may even block the flow of ink through the jets resulting in the cessation of the discharge of droplets therefrom. In either situation the result is the same, ink droplets are inaccurately deposited on the paper being printed on, diminishing the quality of the final image.

Many ink jet printers are provided with a priming system for forcing a full head of ink to its jetting chambers and for flushing contaminants out of the jets. Typically, priming systems operate by applying pressure to a reservoir where the ink is stored prior to its discharge through the jets. The pressure forces ink through the jets up to the jet openings so as to fill the jets with ink to insure proper performance, including the consistent discharge of ink droplets of substantially identical size whenever the ink jets are activated.

Many priming systems operate by supplying pressurized air to the ink reservoir. The air forces the ink in the reservoir through the ink jets.

Current priming systems typically have a valve or seal used to close a first opening through which ink is supplied to the inking system. After the first opening is closed, air is introduced into the reservoir through a second opening which may have its own valve or seal. After priming is completed, the valves or seals associated with both openings must be set in the appropriate positions so that they do not interfere with the supply of ink to the reservoir or with the printing process.

These priming systems have a number of disadvantages. These systems usually have a large number of small moving parts which must work properly, and in the proper sequence, for priming to be successful. Moreover, the large number of parts these priming systems have occupy a significant amount of space and thus make it difficult to reduce the overall size of the ink jet printer. These priming systems also tend to be complex to install and expensive to manufacture.

Another disadvantage associated with current priming systems is that they are often an integral part of the reservoir and associated ink jets they are designed to prime. Color ink jet printers usually have one reservoir and set of jets for each color of ink discharged. Thus, to provide a color printer with a complete priming system, it is necessary to provide an individual priming system for each reservoir and jet assembly. This adds to the overall complexity of the printer, the space the priming system occupies, the possibility that the priming system will malfunction, and the cost of the priming system.

Still another disadvantage of current priming systems is that they sometimes leave the jets they are intended to prime with a bubbly froth head. This happens because the ink primed through the jets travels at a very high velocity. Consequently there is a significant amount of turbulence at the head of flow and when it reaches the reduced diameter of the jet opening, turbulence leaves bubbles in the jetting chamber. Furthermore, the walls of many ink jets are often not sufficiently "wetted" prior to priming of the jets. As a result the high velocity priming ink tends to travel in the center of the jets, away from the wall. This is another source of turbulence during the priming flow that sometimes causes bubbles to remain after priming is completed. In either case, the bubbles that remain in the jetting chamber after the priming process defeat the purpose of the prime.

A further problem with many ink jet priming systems is that they do not consistently "stream" ink discharged during the priming process. Streaming is the discharge of ink at or above a sufficient velocity so that it is deposited in the appropriate waste container. Many ink jet priming systems cause the ink to trickle out of the ink jets at either the beginning or end of the priming discharge. Ink that so trickles out of the ink jets can dirty the face of the jets possibly distorting the discharge of the ink drops or smearing paper that is passed adjacent thereto. Alternatively, ink that trickles out of the ink jets can flow down the printer, dirtying the entire printer assembly and possibly fouling the printer electronics or working components.

Hot melt ink jet printers have a special problem with ink that trickles out the ink jets. Eventually the ink hardens into a solid mass that if not removed, almost always adversely affects the printer's operation.

To date, few ink jet priming systems have found a way to eliminate problems associated with ink trickle during the priming process. Some priming systems simply have brushes or other wiping mechanisms to clean trickled ink off the face of the jets after priming.

Moreover, many current ink jet priming systems have one or more subsystems that require operator assistance to properly function. For instance, some priming systems have hand-operated pumps system to supply the pressurized air and ink needed to prime the jets. Other priming systems may require the user to set one or more of the valves and seals needed to control the flow of air and ink through the jets. These systems suffer the inefficiencies of human operation.

Furthermore, over time, the operator manipulated parts of these priming systems may become covered with ink or other dirt so as to make priming the printer an unpleasant task. Also, all ink jet priming systems generate waste ink which must be collected for removal. Some priming systems are provided with a waste ink collection and removal subsystems that makes the removal of the waste ink an inherently dirty task. Thus, in some situations the tasks required for the operator to prime the printer may be considered so unpleasant that priming is performed carelessly, or not at all.

SUMMARY OF THE INVENTION

Accordingly, it is an object of this invention is to provide an efficiently designed ink jet priming system which requires only a minimal number of moving parts and occupies only a small amount of space.

A further object of this invention to provide an ink jet priming system that does not have to be integrally attached to the ink jets it is designed to prime, so it can be used to prime a number of different sets of ink jets such are used in a color ink jet printer.

An additional object of this invention is to provide an ink jet priming system wherein there is minimal turbulence associated with the flow of ink primed through the printer.

An additional object of this invention to provide an ink jet priming system wherein all the ink discharged from the ink jets during the priming process is streamed out into an appropriate receptacle.

Another object of this invention is to provide an ink jet priming system that automatically primes the ink jets without any operator assistance or intervention.

A still further object of this invention is to provide an ink jet priming system that can be installed with a minimal amount of effort and expense.

In accordance with the present invention, a single ink jet priming system is provided adjacent a moving print head that includes one or more ink jet reservoirs from which ink is supplied to one or more ink jets. Each reservoir is formed with a separate reservoir opening through ink is supplied therethrough.

The ink priming system includes a selectively closeable seal designed to cover any one of the individual reservoir openings. A capture assembly is provided to position the print head so that when the seal is set it will close directly over the appropriate reservoir opening. Formed in the seal is an opening selectively connected to a remote air tank charged with pressurized air. The flow of pressurized air to the reservoir is controlled so that there is an initial low pressure flow followed by a higher pressure priming flow which abruptly ends. A gutter assembly, connected to a disposable waste container is provided to receive ink discharged from the ink jets during the priming process. The individual elements of the ink priming system are actuated by electromechanical devices that are controlled by a single printer control circuit.

When the ink jet priming system of this invention is operated, the print head is moved until latched by the capture assembly so that the selected ink jets can be primed. The seal is closed over the reservoir opening associated with the jets to be primed. Pressurized air is introduced into the reservoir through the seal opening. The air forces ink in the reservoir through the ink jets connected thereto so that each jet has a full head of ink up through its jetting chamber. A fraction of the ink forced through the ink jets is discharged therefrom into the gutter assembly where it drains into the disposable waste container.

The ink jet priming system of this invention supplies priming air to the ink jets and reservoirs through the same opening through which ink is supplied. This eliminates the needed to provide a large number of parts to first close one opening and then supply air through another. This reduces the complexity of the priming system, and the amount of space it occupies.

The ink jet priming system supplies priming air that is at a low pressure initially and is followed by air under high pressure. The low pressure air serves to first force ink up into the jetting chambers, almost to the jet openings, without turbulence. The high pressure air then causes the ink to be discharged through the jet openings with such force that it streams into the gutter assembly. The abrupt termination of the priming flow causes the streaming discharge of the primed ink to abruptly cease. Thus only streamed ink is discharged by the ink jet priming system. This eliminates the trickling of ink that priming can produce and the attendant problems it causes.

Moreover, the low pressure priming flow forces ink into the jetting chambers with only a minimal amount of turbulence. This reduces the development of froth heads in the jetting chambers that sometimes occurs as a result of the priming process.

This priming system is not an integral part of the ink jets and the reservoirs it is designed to prime. By selectively positioning the print head carrying the ink reservoirs and ink jets, all the ink jets may be primed by the single priming system. This further reduces the complexity of the priming system and the space it occupies.

Furthermore, this priming system is completely automated. After the priming sequence is activated, there is no need for any other operator intervention or activity. This minimizes the disagreeable tasks associated with priming, eliminating reasons for the operator to avoid priming the printer. Moreover, the waste ink generated by priming is stored in a disposable waste container that can be changed with a minimal amount of effort and unpleasantness.

Since this priming system is composed of a minimal number of components, and only one system is required for printers having a multiple number of reservoirs, it is easy to install and economical to manufacture.

BRIEF DESCRIPTION OF THE DRAWINGS

This invention is pointed out with particularity in the appended claims. The above and further advantages of this invention may be better understood by referring to the following description taken in conjunction with the accompanying drawings in which:

Figure 4:
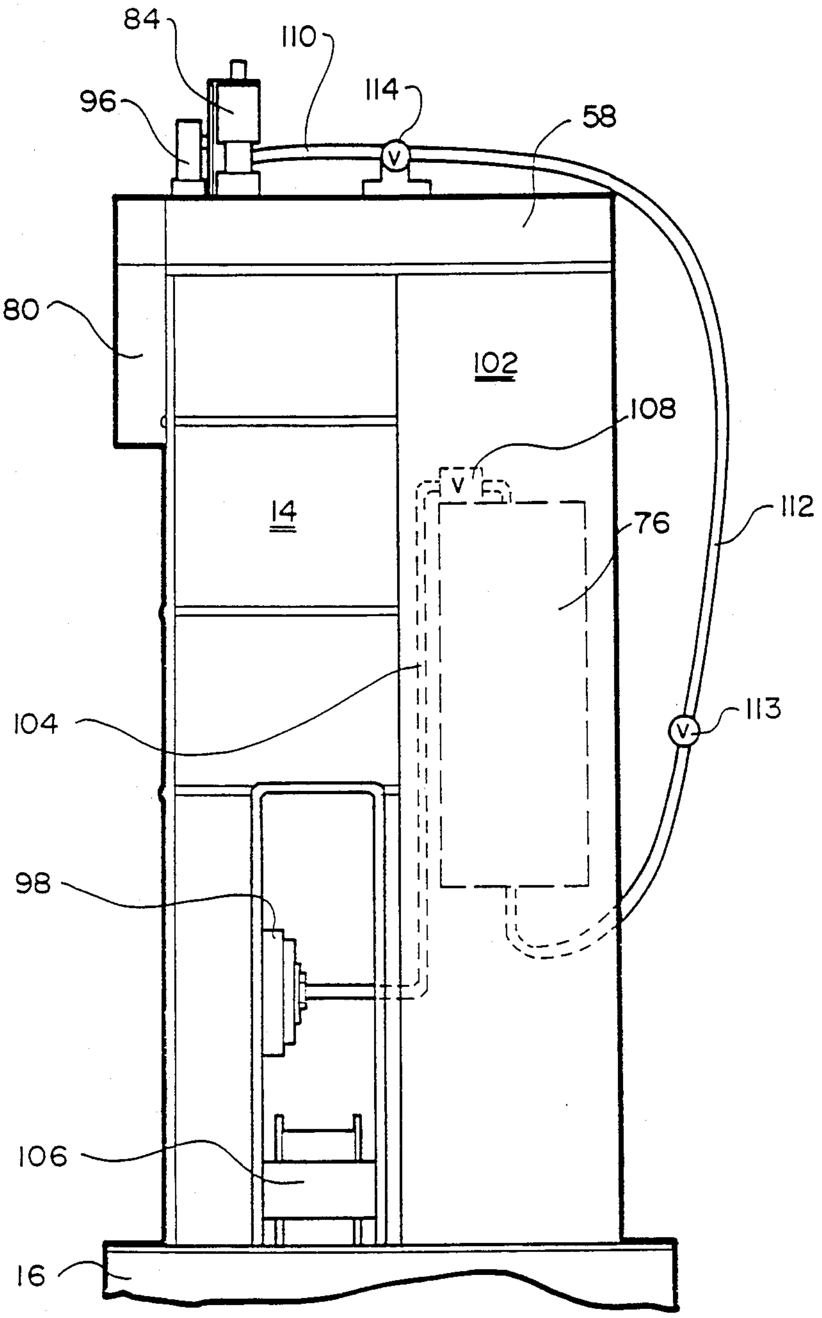
FIG. 4 is a side view showing the air supply tank and pump associated with the ink jet priming system of this invention.

FIG. **4*a* is an enlarged view of the air supply line and restricter valve shown in FIG. 4**.

Figure 5:
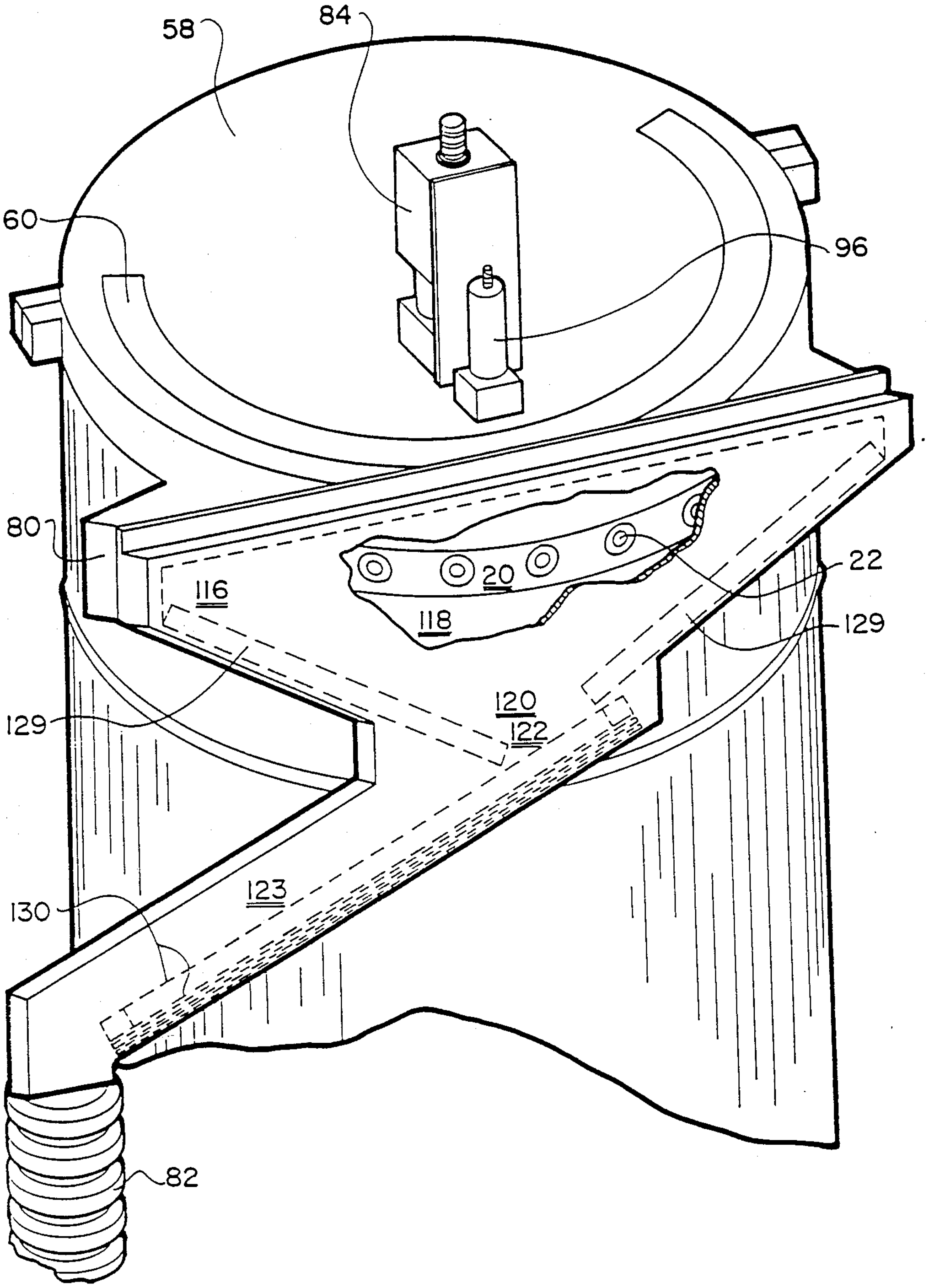

FIG. 5 is an exploded front view showing the ink jet priming system of this invention including the gutter assembly.

Figure 6:
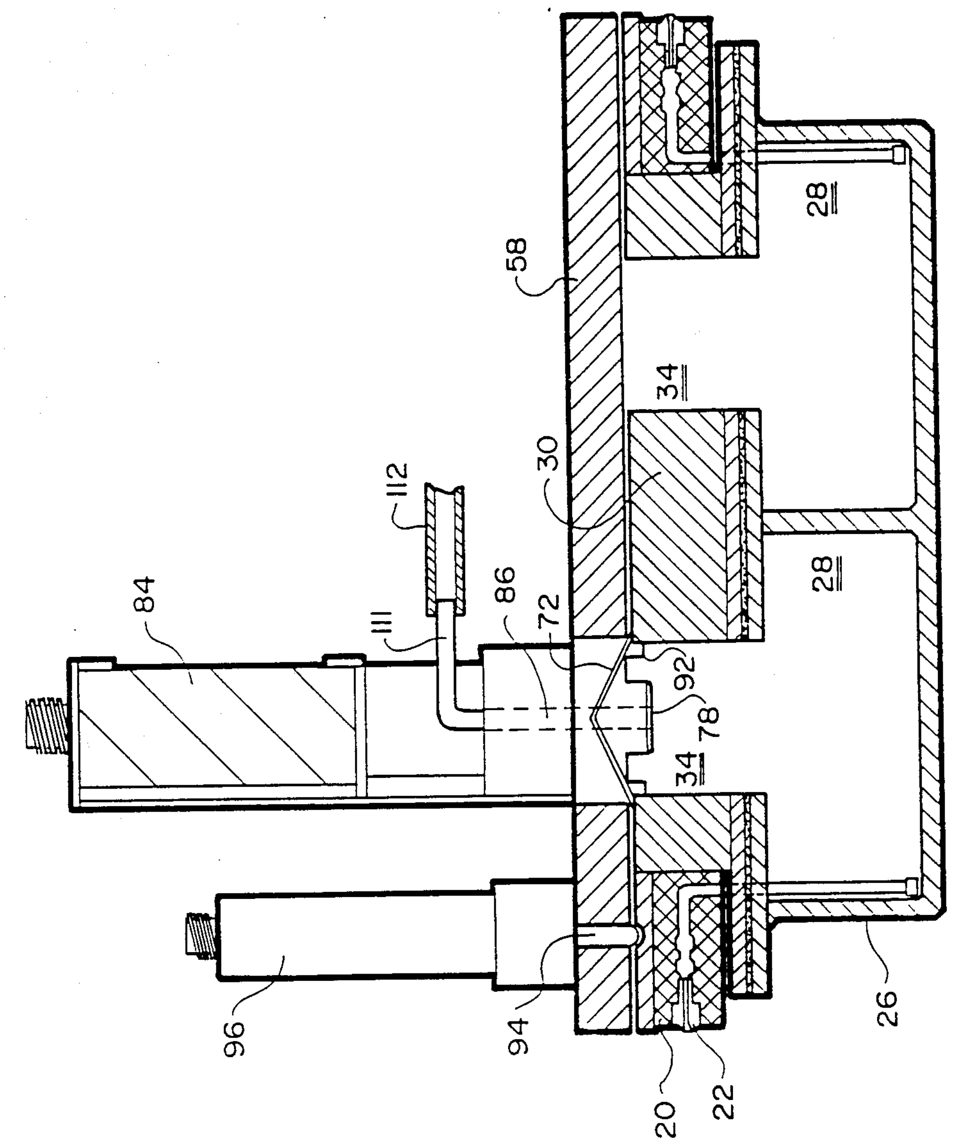

FIG. 6 is a cross-sectional view showing the top portion of the ink jet printer when the ink jet priming system of this invention is active during the priming process.

Figure 7:
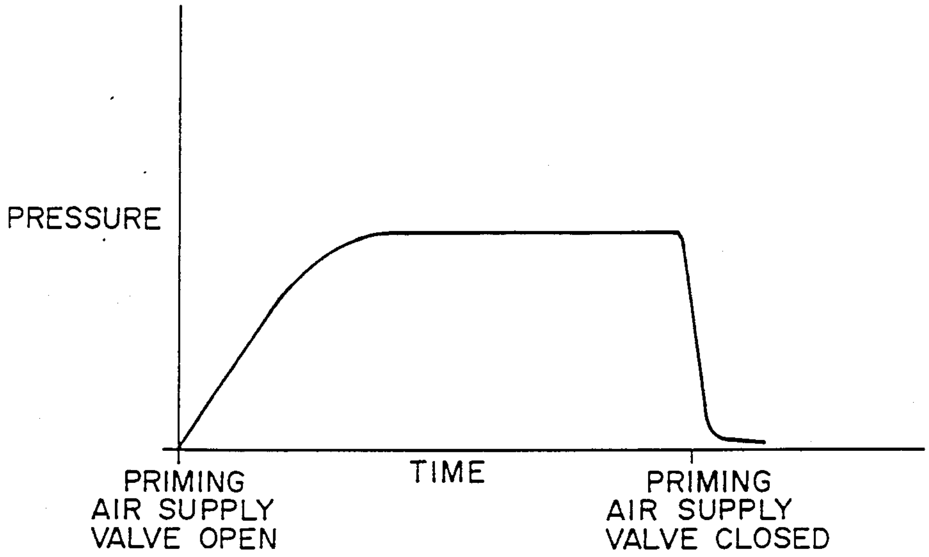

FIG. 7 is a graph, pressure versus time, of the priming air flow of the ink jet printer of this invention.

Figure 8:
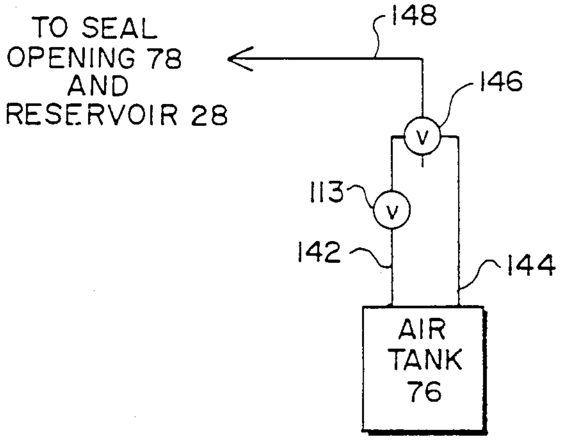

FIG. 8 is a block diagram of an alternative embodiment of the invention wherein priming air can be selectively supplied to a reservoir through an air supply line containing a flow restricter valve or through an air line without a flow restricter device.

FIGS. **9*a* and 9*b*** are timing diagrams for two processes of operating a clapper valve used to regulate the priming air flow of the ink jet printer of this invention.

Figure 9A:
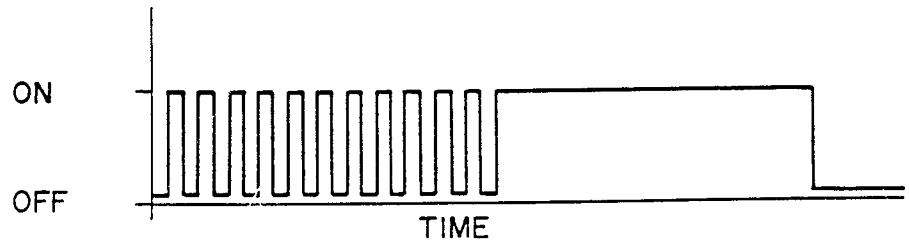

FIG. **10*a* is a graph, pressure versus time, of the priming air flow produced in response to the operation of the clapper valve in accordance with the timing diagram of FIG. 9*a***.

Figure 9B:
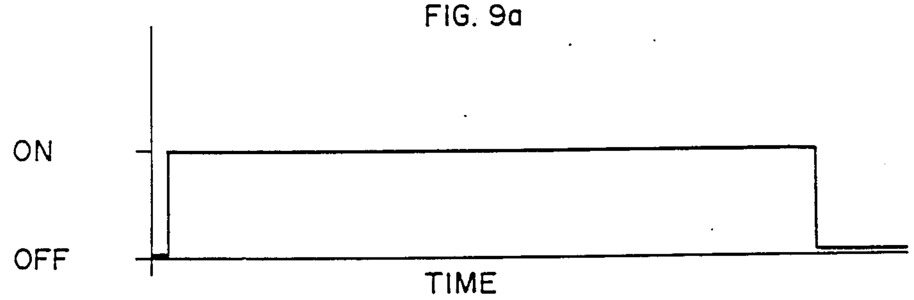

FIG. **10*b* is a graph, pressure versus time, of the priming air flow a reservoir is supplied with through either an air supply line without a restricter valve as illustrated in FIG. 8 or through a clapper valve set to a steady set as depicted in the timing diagram of FIG. 9*b***.

DETAILED DESCRIPTION OF AN PREFERRED EMBODIMENT

Figure 1:
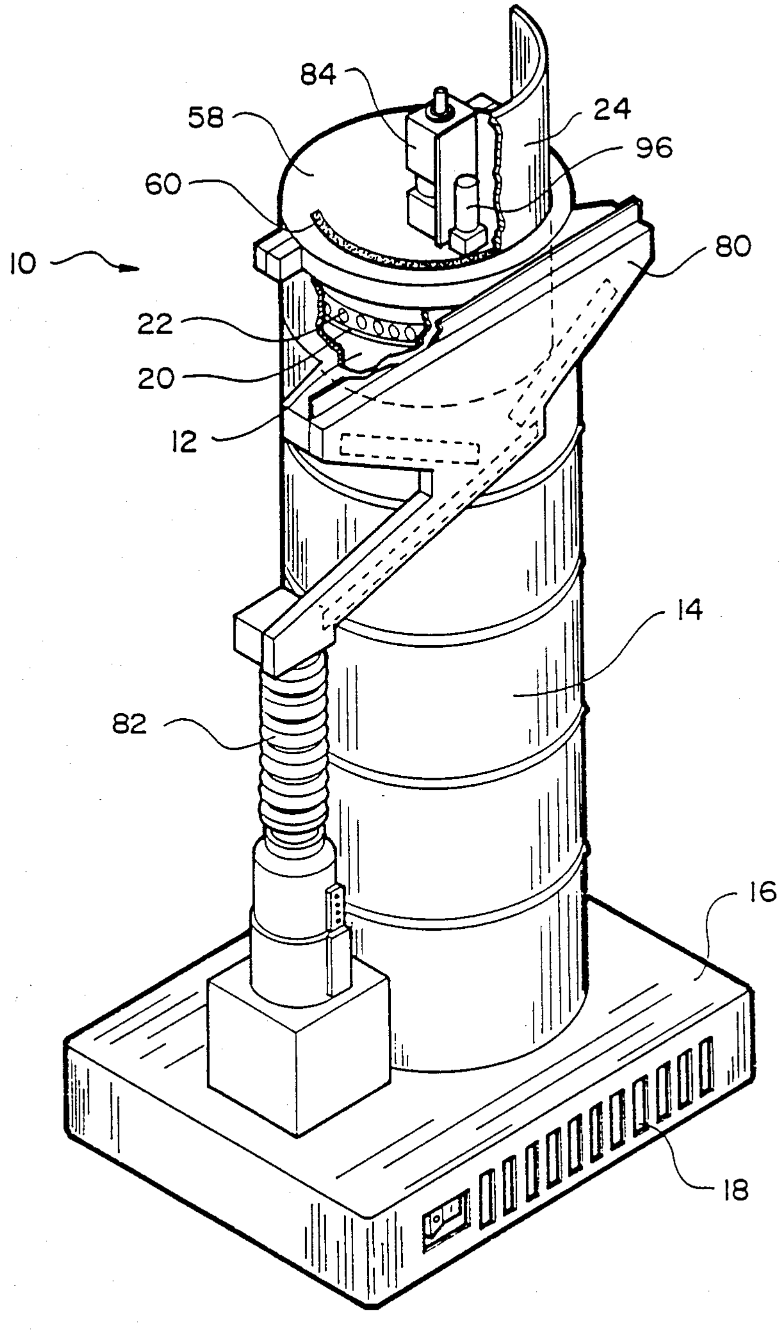
FIG. 1 is an exploded perspective view of an ink jet printer with part of the ink jet priming system of this invention.

FIG. 1 illustrates an ink jet printing system 10 which includes an image insert assembly 12 partially encased within a lower outer shell 14. The image insert assembly 12 and lower outer shell 14 are mounted on a base platform 16 in which a printer control circuit 18 is housed. The printer control circuit 18 contains the logic circuitry necessary to operate the printing system 10. The image insert assembly 12 includes a cylindrical print head 20, which serves as an inking assembly, that contains a number of ink jets 22. A sheet of paper 24 is fed up through the printing system 10 between the image insertion assembly 12 and the outer shell 14. The paper subtends an arc approximately two-thirds around the circumference of the print head 20. When the printing system 10 is in operation, the paper moves upward, the print head 20 rotates, and ink droplets from the ink jets 22 are selectively discharged onto the paper to form ink dots (not illustrated). The final image produced on the paper 24 is a cumulative form of the individual dots that are formed on it.

Figure 2:
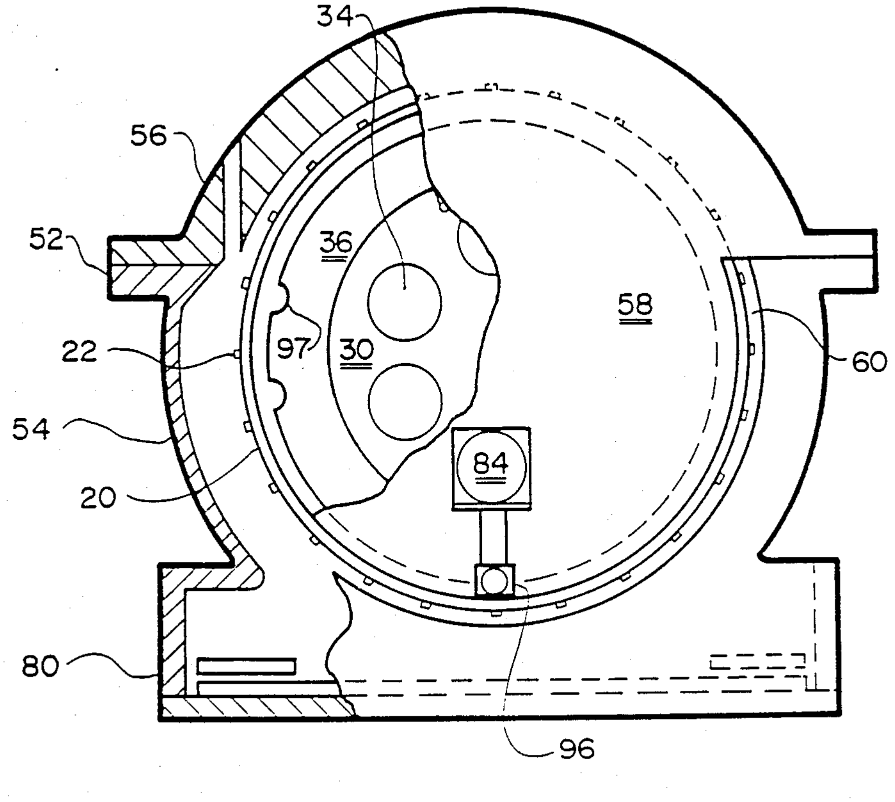
FIG. 2 is a top exploded view showing a multi-reservoir rotary print head of the ink jet printer including portions of the ink jet priming system of this invention.
Figure 3:
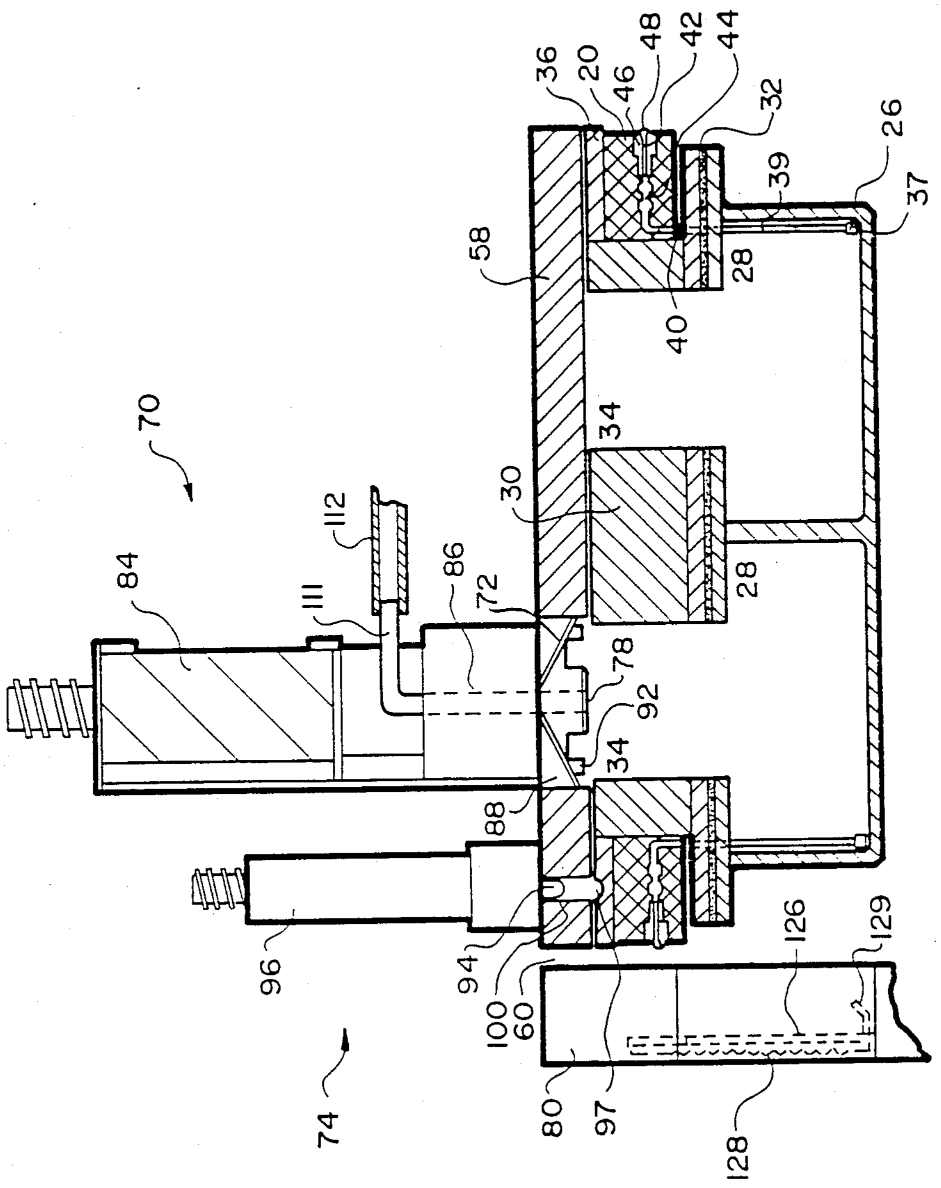
FIG. 3 is a cross-sectional view of the top portion of the ink jet printer including the print head and portions of the ink jet priming system of this invention.

FIGS. 2 and 3 illustrate the print head 20 in greater detail. The print head 20 includes a reservoir cup 26 that defines a number of individual reservoirs 28. If the printing system 10 is used for color printing, each of the reservoirs would contain a different color ink, one for each of the primary colors, and at least one to store black ink. A feed tube support cover 30 is secured over the top of the reservoir cup 26, with a sealing gasket 32 therebetween. Reservoir openings 34, through which ink is supplied to the individual reservoirs 28, are formed in the feed tube support cover 30. A ring-shaped print head top cover 36 is disposed around the outer perimeter of the feed tube support cover 30 and has an outside diameter slightly greater than the circumference subtended by the exposed faces of the ink jets 22.

If the printing system 10 is provided with a hot-melt inking system, the print head 20 may be provided with a set of heating elements, (not illustrated), adjacent the reservoirs 28 and ink jets 22. This makes it possible to supply solid chunks of ink into the reservoirs 28 through the reservoir openings 34 so they may liquefy therein and be discharged from the ink jets 22.

A number of ink jets 22 are connected to each of the reservoirs 28. Each jet 22 includes a small filter 38 located at the base of the reservoir 28 through which the ink is drawn. The filter 38 is connected to a fill tube 39 which extends out of the reservoir through a jet opening 40 in the feed tube supply cover 30. The fill tube 39 is connected to a jetting chamber 42 by a hose 44. A transducer 46 is disposed around the jetting chamber 42 and is designed to impart vibrational motion to it. The open end of the jetting chamber 42, is tapered and terminates in a jet opening 48 which is on the outside face of the jet.

An upper shell assembly 52, attached to the lower outer shell 14, is disposed over the print head 20. The upper shell assembly 52 includes a front arcuate cover section 54 a and rear arcuate cover section 56 adjacent to the ink jets 22. An off wheel ink supply cover 58, integral with the rear cover section 56, extends over the print head 20. The off wheel ink supply cover 58 is spaced away from the front cover section 54 so as to form a slot 60 therebetween the paper 24 passes through.

An ink jet priming system 70 is mounted to the off wheel supply cover 58. The ink jet priming system 70 includes a seal 72 that is selectably closeable over any reservoir opening 34 in registration under it. A capture assembly 74 is provided so the print head 20 can be positioned so that any one of the reservoir openings 34 can be placed in registration with the seal 72. An air tank 76 (FIG. 4) is connected to an opening 78 formed in the base of the seal 72. The air tank 76 contains pressurized air that during that is selectively supplied to the ink reservoirs 28 during the priming process. A gutter assembly 80 is integral with the upper shell front cover section 54 and positioned so that it is opposite the ink jets 22 that are set to be primed 22. A disposable waste container 82 (FIG. 1) is connected to gutter assembly 80 serves as a receptacle for ink discharged by the ink jets 22 during the priming process.

With this background, it is possible to understand the ink jet priming system 70 of this invention in greater detail. Referring to FIG. 3, the seal 72 is attached to a push-pull seal solenoid 84 by an air tube 86 that extends axially therebetween. The seal 72 is normally seated in a cavity 88 in the off wheel ink supply cover 58 immediately above the feed tube support cover 30. The seal 72 is positioned so that any one of the ink supply openings 34 can be in registration thereunder. The seal 72 includes a cap 90 that projects over the reservoir opening 34 and an annular lip 92 dimensioned to abut the wall defining a reservoir opening 34. The seal opening 78 is formed in the center of the seal 72.

The capture assembly 74 includes a capture probe 94 attached to a push-pull capture solenoid 96 mounted to the off wheel ink supply cover 58 adjacent the slot 60. The capture probe 94 is normally seated in a probe cavity 100 formed in the off wheel ink supply cover 58 and is directed towards the print head top cover 38. The end of the capture probe 94 is designed to be inserted into complimentary positioning notches 96 formed in the print head top cover 36. The positioning notches 96 are positioned so that when the end of the capture probe 94 is in a notch 96, an associated reservoir opening 34 is in registration with the seal 72.

The air tank 76, depicted in FIG. 4, from which air is supplied to the reservoirs 28 is mounted to a vertical frame 102 adjacent the lower outer shell, (air tank shown in phantom). A pump 98, attached to the frame 102 supplies pressurized air to the tank 76 through a tank supply line 104. Typically, the air in the tank 76 is kept pressurized to approximately to 12 p.s.i. The pump 98 is driven by an AC coil 106 adjacent the printer base platform 16. A check valve 108 in the tank supply line 104 insures the flow of air therein is one-directional towards the air tank 76.

The air tank 76 is connected to the seal opening 78 by a lateral extension 111 of the seal air tube 86 by an air supply line 112. A solenoid actuated three-way air supply valve 114 on the off wheel ,ink supply cover 58 controls the flow of air through the air supply line 112. The valve 114 has a first, closed, position wherein the portion of the air supply line 112 towards the reservoir 28 is open to the atmosphere and the air supply line 110 towards the tank 80 is sealed; and a second, open, position wherein the air supply line 112 is open between the air tank 76 and the reservoir 28.

Figure 4A:
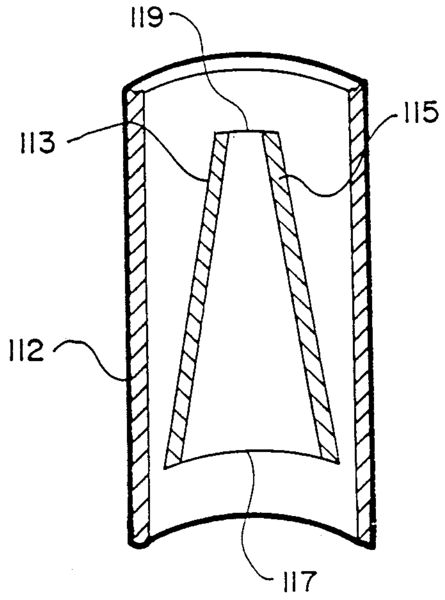

A restricter valve 113 is located in the air supply line 112 between the air tank 76 and the supply valve 114. As best depicted in FIG. 4*a*, the restricter valve is a conduit 115 with a generally frusto-conical profile coupled to the air line 112 so that the end forming a large diameter opening 117 is orientated towards the air tank 104 and the end forming the smaller diameter opening 119 is oriented towards the supply valve 114.

The gutter assembly 80, best seen by reference to FIG. 5, includes a gutter shell 116 that projects outward from the front cover section 54. The gutter shell 116 defines a discharge chamber 118 with approximately rectangular dimensions adjacent to the print head 20. The gutter shell is formed in the front cover section so that the discharge chamber 118 is opposite the ink jets 22 that are positioned for priming. A drain chamber 120, also defined by the gutter shell 116, is contiguous with and below the discharge chamber 118. The drain chamber 120 has a tapered base 122 that terminates into a gutter duct 124 defined by the gutter shell 116. The gutter duct 124 leads from the drain chamber 120 to the disposable waste container 82 which is removably attached to the gutter assembly 80.

Metal plating 126 (shown in phantom, FIG. 3) is located around the inside of the gutter shell 116 adjacent the discharge chamber 118, the discharge chamber 120 and the gutter duct 124. If the printing system 10 includes a hot-melt inking system, heating elements 128 (FIG. 3) may be located under portions of the plating 126 to insure the discharged ink readily flows into the waste container 84. The plating 126 includes J-shaped flanges 129 at the base 122 of the drain chamber 120. The flanges 129 and the plating 126 form drain ducts in the base 122 of the drain chamber 120 that lead to the gutter duct 124. A J-shaped gutter flange 130 extends from the plating 126 so that the gutter duct 124 is defined therebetween.

The ink jet priming system 70 of this invention is controlled by the printer control circuit 18. Thus, the image insertion assembly 12 including the print head 20, the seal solenoid 84, the capture solenoid 96, the air pump 98, and the air supply valve 114 are all controlled by the printer control circuit 18, and/or send response signals to it.

The ink jet priming system 70 initiates the priming sequence either automatically, such as when the printer 10 is initially turned on, or in response to an operator command. If the printing system 10 is provided with a hot-melt inking system, the priming sequence does not begin until the heating elements in the print head 20 have been activated and the ink in the reservoirs 28 and ink jets 22 has liquefied. It is recommended that prior to priming, a solvent be sprayed into the ink jets 22 to dissolve or loosen any solid deposits of ink or bubbles that may have formed therein. Moreover, it is desirable to deprime or flush some ink jet printers so that their ink jets are free of ink prior to the their being filled with ink during the priming process.

The first step in the priming process is rotating the print head 20 so that the reservoir opening 34 leading to the ink jets 22 to be primed is in registration with the seal 72. The print head 20 is rotated so it is in the approximately correct position, and the capture solenoid 96 is then activated so the capture probe 94 is extended downward and abuts the print head top cover 36. The print head 20 continues to rotate until the capture probe projects into the appropriate positioning notch 96, so as to latch the print head 20 in the correct position, as depicted in FIG. 6.

When the print head 20 is in the latched position, the ink jets 22 to be primed are directed towards the discharge chamber 118 and the opening seal 72 is over the appropriate reservoir opening 34. The seal solenoid 84 is activated so that the seal 72 is depressed over the reservoir opening 34. After the seal 72 is in position, the air supply valve 114 is turned to the open position so air from the tank 76 flows through the air supply line 112 the air tube 86 and the seal opening 78 into the reservoir opening 34 and the reservoir 28. The pressurized air urges the seal lip 92 against the wall of the reservoir opening 34 to maintain the integrity of the barrier formed by the seal 72.

The pressurized air forces some of the ink in the reservoir 28 through the ink jets 22 it supplies. A portion of the ink forced through the jet openings 48 and is discharged therefrom into the discharge chamber 118. After priming, the ink not discharged from the ink jets 22 remains therein where it is held in the jetting chambers 42 up to the jet openings so that a full head of ink is maintained by the surface tension of the ink.

The restricter valve 113 regulates the flow of priming air from the air tank 74 into the reservoir 28. As depicted by FIG. 7, the air flow is regulated so that it is initially at a relatively low pressure that subsequently increases to a desirable high pressure for priming. The initial low pressure air forces ink in the reservoir through the jets 22 into the jetting chambers 42. The high pressure air then has sufficient force to stream the ink discharged from the ink jets 22 into the discharge chamber 118. In one embodiment of the invention, the restricter valve is constructed so that it takes approximately 100 milli-seconds for the priming air flow to reach the high pressure needed to make the discharged ink stream.

After the ink jets 22 are primed, the supply valve is turned so that flow of priming air to the reservoir 28 is abruptly terminated and the reservoir 28 is exposed to ambient air pressure (FIG. 7). The rapid termination of the priming air flow and immediate exposure to the ambient air causes the streaming of ink from the jets to abruptly cease.

The portion of the ink expelled into the discharge chamber 120 flows into the drain ducts 130 and gutter duct 124 into the waste container 84. When the waste container 84 is at or near its capacity of discharged ink, it may be removed from the base platform 16 and replaced.

After the ink jets 22 connected to one of the reservoirs 28 is primed, the image insert assembly 12 can be rotated so the ink jets 22 connected to a different reservoir 28 can be similarly primed. This process can be repeated for each of the reservoirs 28 and associated ink jets 22 until all of the ink jets on the print head 20 are primed.

Priming the ink jets 22 with the priming system 70 of this invention forces any small bits of matter and bubbles out of the jets with the flow of discharged ink. Priming also leaves individual ink jets 22 with full heads of ink so that droplets of substantially identical size can be discharged therefrom.

This priming system 70 supplies priming to the ink jets through the same opening ink is supplied thereto. This minimizes the number of components that have to be provided for this priming system 70 so as to reduce its complexity and the cost of its manufacture. Moreover, since this priming system consists of only a few discrete components, it occupies only a small amount of space on the printer system 10.

Furthermore, this priming system 70, is not specifically attached to any of the reservoirs 28 and ink jets 22 it is designed to prime. As described above, this makes it possible to provide only one priming system 70 to prime all the ink jets, even in printing systems with multiple reservoirs 28 such as are required by color printers. This reduces the complexity, cost and space considerations of providing the printing system 10 with a means to prime the ink jets 22.

The restricter valve 113 and the supply valve 114 control the flow of priming air so that ink expelled from the jets during priming is discharged in a stream flow. This eliminates the trickling of ink that occurs before and after the main priming discharge and the attendant problems it causes.

Moreover the initial low pressure priming air flow forces ink into the ink jets with substantially reduced turbulence. This is in part because the center of flow of the slower ink flow is not significantly ahead of the flow adjacent to the ink jet walls, which is slowed by the friction of the liquid-boundry contact. Furthermore, less turbulence is developed when the slower ink flow contacts the reduced diameter around the ink jet opening 48. Consequently, since the turbulence associated with priming is minimized, so is the possibility that a froth head of will form in the ink jets 22 as a result of priming.

This ink jet priming system 70 is completely automated. After the priming sequence is initialized, no other operator assistance or manipulation is required to prime the ink jets 22. This eliminates the unpleasantness associated with the priming process which may otherwise cause an operator to forget to perform the prime, or perform it improperly. Also, the operator never has to handle the waste ink generated by the priming process; it all drains into the waste container 82 which may be disposed of and replaced with a minimal amount of effort.

FIG. 8 is a block diagram of an alternative embodiment for the ink jet priming system 70. Two tank air lines 142 and 144 respectively may be provided between the air tank 76 and a four-way valve 146 that controls the flow of priming air to the reservoirs 28 through an air supply line 148. Tank air line 142 contains the restricter valve 113 mounted therein. Air supply line 144 is not provided with any means to regulate the flow of priming air therethrough. Valve 146 has three positions: both air tank air lines 142 and 144 are sealed and air supply line 148 towards the reservoirs 28 open to the atmosphere; air supply line 148 connected to receive tank air through tank air line 142 and tank air line 144 sealed; and air supply line 148 connected to receive tank air through tank air line 144 and tank air line 142 sealed.

The ink jet priming system 70 of this embodiment of the invention can supply priming air through either air supply line 142 or 144 to a reservoir 28 it is set to prime. Air supplied through air supply line 142 comprises an initial low pressure flow followed by gradual building to a high pressure flow as described in the first embodiment of this invention. Air supplied through air supply line 144 comprises a high pressure flow that rapidly reaches it maximum pressure. FIG. **10*b* depicts the flow of priming air supplied a reservoir 28 through air supply line 144. The flow of priming air from either air supply line 142 or 144 is stopped by turning the valve so the reservoir 28 is exposed to the atmosphere. Consequently, regardless of which air supply line 142 or 144** is used as the source of priming air, the flow of priming air will abruptly cease as in the first embodiment of this invention.

This embodiment of the invention can provide priming air with that has either a gradual pressure rise or a rapid pressure rise to the reservoir 28 it is set to prime. The gradual rise or "soft" priming air is used to initially prime the jets 22 such as the start of the day when the printer 10 is first turned on. The rapid pressure rise or "hard" priming air is used if the initial priming of the jets was unsuccessfully or there was some other indication the ink jets have become inoperable but still contain ink. Since there is already ink in the ink jets 22 when the hard priming air is applied, the ink is almost instantaneously streamed out of the ink jets avoiding trickling. Accordingly, by providing the source of hard priming air, the need to totally repeat the priming process, including any depriming step, is eliminated.

Furthermore, this embodiment of the ink jet priming system 70 can be set to operate so that when the ink jets are initially filled they are automatically first subjected to a soft prime and than a hard prime. This would almost insure that prior to operation, each ink jet 22 in the printer has a full head of bubble-free ink so that the printer would produce quality hard copy output when activated.

Alternatively, the needed to provide the restricter valve can be eliminated if the supply valve 114 is operated as a rapidly oscillating flow control valve. FIG. **9*a* depicts the closed-open time sequence the valve 114 should be operated at in order to achieve a gradual build up of high air pressure to prevent the pre-streaming trickling of ink during the priming process. The valve 114** is actuated so during an initial time period it is rapidly closed and opened before a stable open state allowing high pressure air flow is established. In one embodiment the initial time period is approximately 200 milliseconds during which the valve is turned opened 10 times, 10 milli seconds each time alternating between being closed 10 times, 10 milli seconds each time.

FIG. **10*a* depicts the pressure pattern of the air supplied to a reservoir 28 when the valve 114 is rapidly oscillated. There is gradual pressure in the approximate form of a curved sawtooth pattern until the valve 114 is set in the stable open state and the maximum high pressure is maintained. This allows a soft priming air flow to be initially applied to the reservoir 28 so that ink is slowly forced through the ink jets 22** until the high pressure priming air flow is applied that will stream the ink therefrom.

Figure 10A:
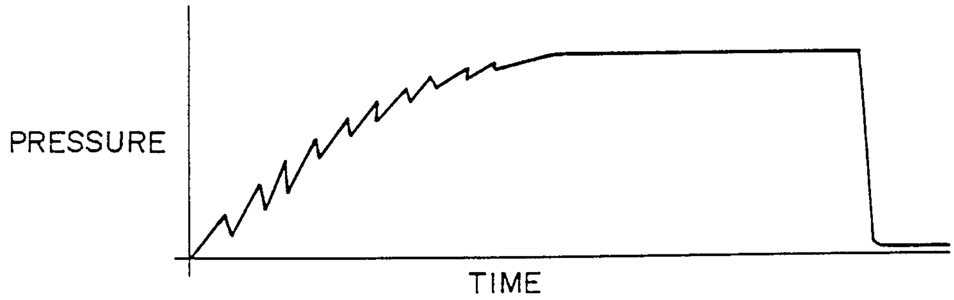
Figure 10B:
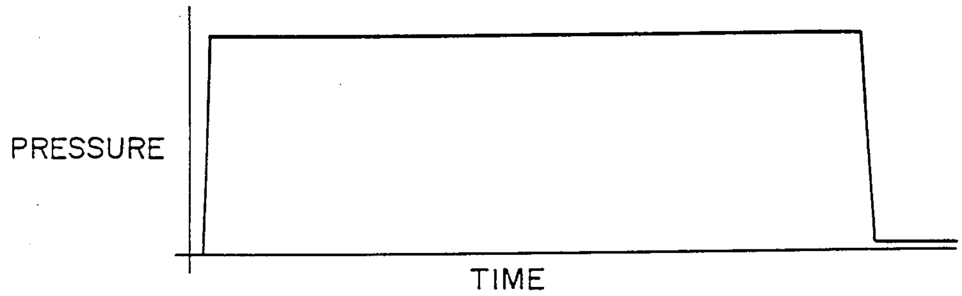

This embodiment of the ink jet printing system can also be used to supply hard priming air that has a rapid pressure rise to a reservoir 28. FIG. **9*b* illustrates a timing sequence where the valve 114 is immediately set to a stable open state. As depicted by FIG. 10*b*, this causes priming air with having a rapid pressure rise to be supplied to the reservoir 28. The valve 114 is operated in this manner when it is necessary to prime ink jets 22** that already have ink in them and it thus desirable to prevent trickling or having to totally deprime and reprime the jets.

This embodiment of the invention can also be operated so that when the ink jets are initially filled there are subjected to a soft prime so that they are at least partially filled by ink, and then a hard prime so they are left full, bubble-free heads of ink. Moreover, operating the supply valve 114 in accordance with this embodiment of the invention can also be used to provide the desirable abrupt termination of priming air that causes the streaming of the primed ink to abruptly cease.

The foregoing description has been limited to a specific embodiments of this invention. It will be apparent, however, that variations and modifications may be made to the invention, with the attainment of some or all of the advantages of the invention. For example, in the described embodiment of the invention the printing system 10 has a rotating print head 20 which is positioned under the seal 72. In an alternative embodiment of the invention, the print head may move in a substantially linear path and a linear movement may place it under the seal 72.

Also, other means besides the capture probe 76 and complementary positioning notches 78 may be used to insure the ink supply opening 34 and opening seal 72 are in registration. For instance, an alternative assembly may include logic control circuitry and an print head positioning means accurate enough to position the print head without the use of a mechanical latch. In still another embodiment of the invention it may be desirable to place the seal 72 and associated assembly on a moving platform that positions itself over the appropriate ink supply opening 34.

Moreover, in some instances alternative placement of the ink supply opening 34 and seal 72 may be desirable. Other mechanisms besides solenoids may be used to insure proper positioning of the opening seal 72 and the capture probe 76. Furthermore other seal designs may be used to insure the integrity of the barrier formed by the opening seal against ink supply opening 34. Other devices may be used to regulate the follow of priming air. For example, in the second embodiment of the invention two solenoid valves may be used to selectively supply air from the air supply lines 142 and 144.

Therefore, it is the object of the appended claims to cover all such variations and modifications as come within the true spirit and scope of the invention.

What is claimed as new and desired to be secured by Letters Patent of the United States is:

1. A priming system for an ink jet printer with a moving print head, the print head forming at least one reservoir having an opening therein through which ink is supplied thereto and at least one ink jet connected to the reservoir, the priming assembly comprising:

A. a seal means mounted to the ink jet printer and selectively closeable over at least one of the reservoir openings, said seal forming an opening into said reservoir; and B. an air supply means in communication with said seal opening for selectively supplying a flow of pressurized air through said seal opening to said reservoir.

2. The priming system of claim 1 further including a registration means for positioning at least one of the reservoir openings in registration with said seal.

3. The priming system of claim 1 further including a gutter assembly attached to the ink jet printer, said gutter assembly positioned to receive ink discharged from the ink jets the reservoir opening which said seal is closed over.

4. The priming system of claim 1 wherein said air supply means includes a tank supplied with pressurized air by a pump means, an air supply line in connected between said tank and said seal opening, and a valve means mounted to control the flow through said air supply line.

5. The priming system of claim 2 wherein said registration means includes:

A. a capture probe mounted to the ink jet printer for selectively abutting the print head; and B. at least one capture notch formed in said print head, said capture notches positioned so that when said capture probe is inserted in one of said notches, an associated reservoir opening is in registration with said seal means.

6. The priming system of claim 3 wherein said gutter assembly means includes a removable waste container positioned to receive ink from said gutter assembly.

7. The priming system of claim 1 wherein said seal means is located above said print head.

8. The priming system of claim 1 wherein said:

A. the print head is a cylindrical rotary print head;

B. the reservoir openings are formed on the top of the print head; and

C. said seal means is mounted to the ink jet printer above said print head.

9. The priming assembly of claim 3 wherein said gutter assembly is provided with heating elements.

10. A method of operating an ink jet printer having a moving print head with at least one reservoir formed therein having an opening therein through which ink is supplied thereto, and at least one ink jet connected to the reservoir, including the steps of:

A. containing at least some ink in liquid state in the reservoirs;

B. sealing one of the reservoir openings with a seal means, said seal means forming an opening into the reservoir; and C. supplying a flow of pressurized air into said sealed reservoir through said seal opening so that a fraction of said ink is discharged through ink jets connected to said reservoir, and a fraction of said ink remains in the ink jets.

11. The method of operating an ink jet printer as set forth in claim 10 including the step of positioning the print head prior to said reservoir opening sealing so that the reservoir opening of the reservoir to be primed is in registration with said seal means.

12. The method of operating an ink jet printer as set forth in claim 10 further including the step of collecting the ink discharged from the ink jets in a removable waste container.

13. The method of operating an ink jet printer as set forth in claim 11 wherein said print head positioning, said reservoir opening sealing, and said air supplying are performed in response to an automatic control.

14. The method of operating an ink jet printer as set forth in claim 10 wherein said reservoirs are supplied with phase change ink, further including the step of heating said ink to liquefication prior supplying air to discharge ink through the ink jets.

15. The method of operating an ink jet printer as set forth in claim 10 including the step of heating the ink discharged from the ink jets.

16. A method of operating an ink jet printer having at least one ink jet supplied with ink from a reservoir including the steps of:

A. containing at least some ink in the reservoir; and

B. applying a gas flow to said reservoir said gas flow having an initial low pressure flow that increases to a high pressure flow so that said ink jets ar primed.

17. The method of operating an in jet printer according to claim 16, further including the steps of:

A. applying said low pressure gas flow so that said ink is forced through the in jets; and B. applying said high pressure gas flow so that ink is discharged from the in jets.

18. The method of operating an ink jet printer according to claim 16 further comprising the step of abruptly terminating said gas flow.

19. An ink jet priming system for an ink jet printer having at least one ink jet connected to receive ink, the ink jet printing means including:

A. an air supply means for selectively providing pressurized air to discharge ink through the ink jets; and B. a flow regulator means connected to said air supply means for controlling the flow of air supplied to the ink jets so that there is a first low pressure flow that gradually increases to a second high pressure flow suitable for discharging ink through said jets.

20. The ink jet priming system of claim 19 wherein said flow regulator means controls the flow of air supplied to the ink jets so that said first low pressure flow is sufficient to force the ink into and at least partially through the ink jets and so that said second high pressure flow is sufficient to discharge the ink from the ink in a stream.

21. The ink jet priming system of claim 19 wherein:

A. said air supply means includes a first air supply line through which said pressurized air is supplied; and B. a regulator valve means is located in said air supply line.

22. The ink jet priming system of claim 21 further including:

A. a second air supply line through which pressurized air is supplied; and

B. a valve means for selectively controlling the flow of pressurized air so that said pressurized air may be selectively supplied from said first air supply line or said second air supply line.

23. The ink jet priming system of claim 19 wherein the flow of said pressurized air is selectively controlled by a supply valve means, said supply valve means operable to provide said first low pressure flow followed by said second high pressure flow.

24. The ink jet priming system of claim 23 wherein said supply valve means is further operable so that said second high pressure flow is applied substantially instantaneously to discharge the ink through the ink jets when said pressurized air is first applied to the ink jets.

25. A method of priming an ink jet printer having at least one ink jet supplied with ink from a reservoir, the ink jets having a first state substantially free of ink, and a second state partially full of ink, the method of priming including the steps of:

A. containing at least some ink in the reservoir;

B. when the ink jets are in the first state, applying a first gas flow to the reservoir, said first gas flow having an initial low pressure flow that increases to a high pressure flow so that the ink jets are at least partially full of ink; and C. when the ink jets are in the second state, applying a second gas flow to the reservoir, said second gas flowing having a high pressure that is applied substantially instantaneously to the reservoir so that said ink jets are provided with a full head of ink.

26. The method of priming an ink jet printer according to claim 25 including applying said first gas flow to at least partially fill the ink jets with ink, and then applying said second gas flow to provide the ink jets with a full head of ink.

27. The method of priming an ink jet printer according to claim 25 or 26 including abruptly said high pressure gas flow.

28. The method of operating an ink jet printer according to claim 17 including heating said ink discharged from the ink jets.

29. A priming system for an ink jet printer with a moving print head, the print head forming at least one reservoir having a reservoir opening, and at least one ink jet connected thereto, the priming assembly comprising:

A. a seal means mounted to the ink jet printer selectively closeable over at least one of the reservoir openings, said seal forming an opening into the reservoir; and B. an air supply means in communication with said seal opening for selectively supplying a flow of pressurized air to the reservoir said seal is closed over, said air supply means including a tank supplied with pressurized air by a pump means, an air supply line in connected between said tank and said seal opening, and a valve means attached to said air supply line mounted to control the flow through said line.

30. The priming system of claim 29 further including a registration means for positioning at least one of the reservoir openings in registration with said seal.

31. The priming system of claim 29 further including a gutter assembly attached to the ink jet printer, said gutter assembly positioned to receive ink discharged from the ink jets the reservoir opening said seal is closed over.

32. The priming system of claim 30 wherein said registration means includes:

A. a capture probe mounted to the ink jet printer for selectively abutting the print head; and B. at least one capture notch formed in said print head, said capture notches positioned so that when said capture probe is inserted in one of said notches, an associated reservoir opening is in registration with said seal means.

33. The priming system of claim 31 wherein said gutter assembly means includes a removable waste container, and said gutter assembly is formed so that ink thereto drains into said waste container.

34. The priming system of claim 29 wherein said seal means is located above said print head.

35. The priming system of claim 29 wherein said:

A. the print head is a cylindrical rotary print head;

B. the reservoir openings are formed on the top of the print head; and

C. said seal means is mounted to the ink jet printer above said print head.

36. The priming assembly of claim 31 wherein said gutter assembly is provided with heating elements.

* * * * *